United States Patent

Schenk et al.

[11] Patent Number: 6,088,248
[45] Date of Patent: Jul. 11, 2000

[54] VOLTAGE CONVERSION DEVICE UTILIZING SYNCHRONOUSLY SEQUENTIAL CONTROLLED PARTIAL CONVERTERS

[75] Inventors: Joachim Schenk, Hemmingen; Frank Sieger, Neckarsulm; Volker Breunig, Heibronn-Neckargartach; Bernd Aupperle, Steinheim, all of Germany

[73] Assignee: Robert Bosch GmbH, Stuttgart, Germany

[21] Appl. No.: 09/214,962

[22] PCT Filed: Apr. 22, 1998

[86] PCT No.: PCT/DE98/01119

§ 371 Date: Jul. 19, 1999

§ 102(e) Date: Jul. 19, 1999

[87] PCT Pub. No.: WO98/53547

PCT Pub. Date: Nov. 26, 1998

[30] Foreign Application Priority Data

May 17, 1997 [DE] Germany ............... 197 20 948

[51] Int. Cl.[7] ........................................ H02M 7/00
[52] U.S. Cl. ................................ 363/65; 363/71
[58] Field of Search ..................... 363/65, 67, 69, 363/70, 71

[56] References Cited

U.S. PATENT DOCUMENTS

| | | | |
|---|---|---|---|
| 5,191,518 | 3/1993 | Recker et al. | 363/71 |
| 5,191,519 | 3/1993 | Kawakami | 363/71 |
| 5,629,844 | 5/1997 | Krichtafovish et al. | 363/65 |
| 5,740,023 | 4/1998 | Brooke et al. | 363/65 |
| 5,796,601 | 8/1998 | Yamamoto | 363/84 |

FOREIGN PATENT DOCUMENTS 0 363 356 B1  5/1991  European Pat. Off. ........ B60R 16/02

Primary Examiner—Adolf Deneke Berhane
Assistant Examiner—Bao Q. Vu
Attorney, Agent, or Firm—Michael J. Striker

[57] ABSTRACT

A voltage conversion device is disclosed which is to be used particularly in motor vehicles. For voltage conversion, a plurality of small voltage converters are connected as partial converters parallel to one another. By sequentially turning on the individual partial converters and superposition of the output current, a uniform output current at low input load is attained.

6 Claims, 2 Drawing Sheets

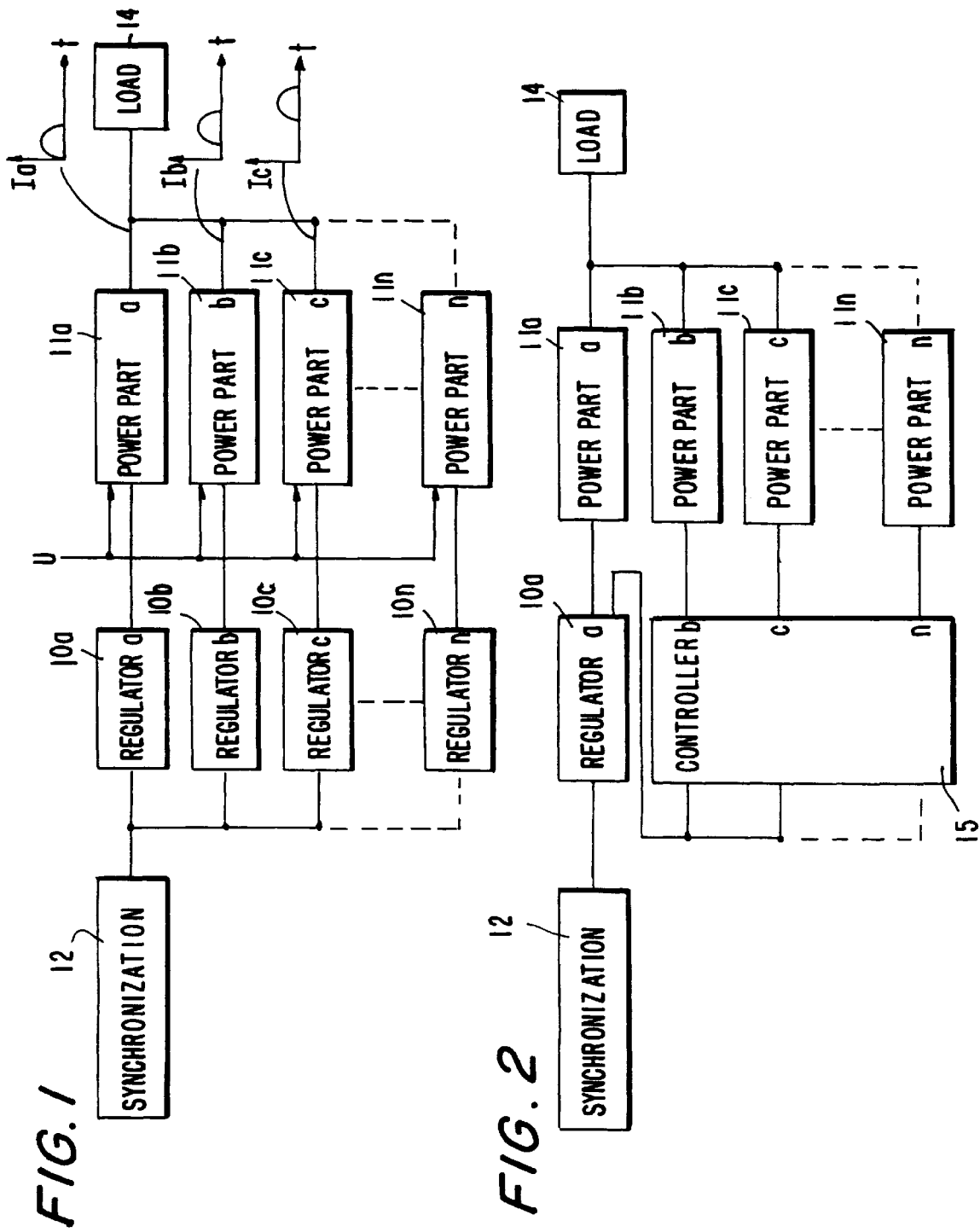

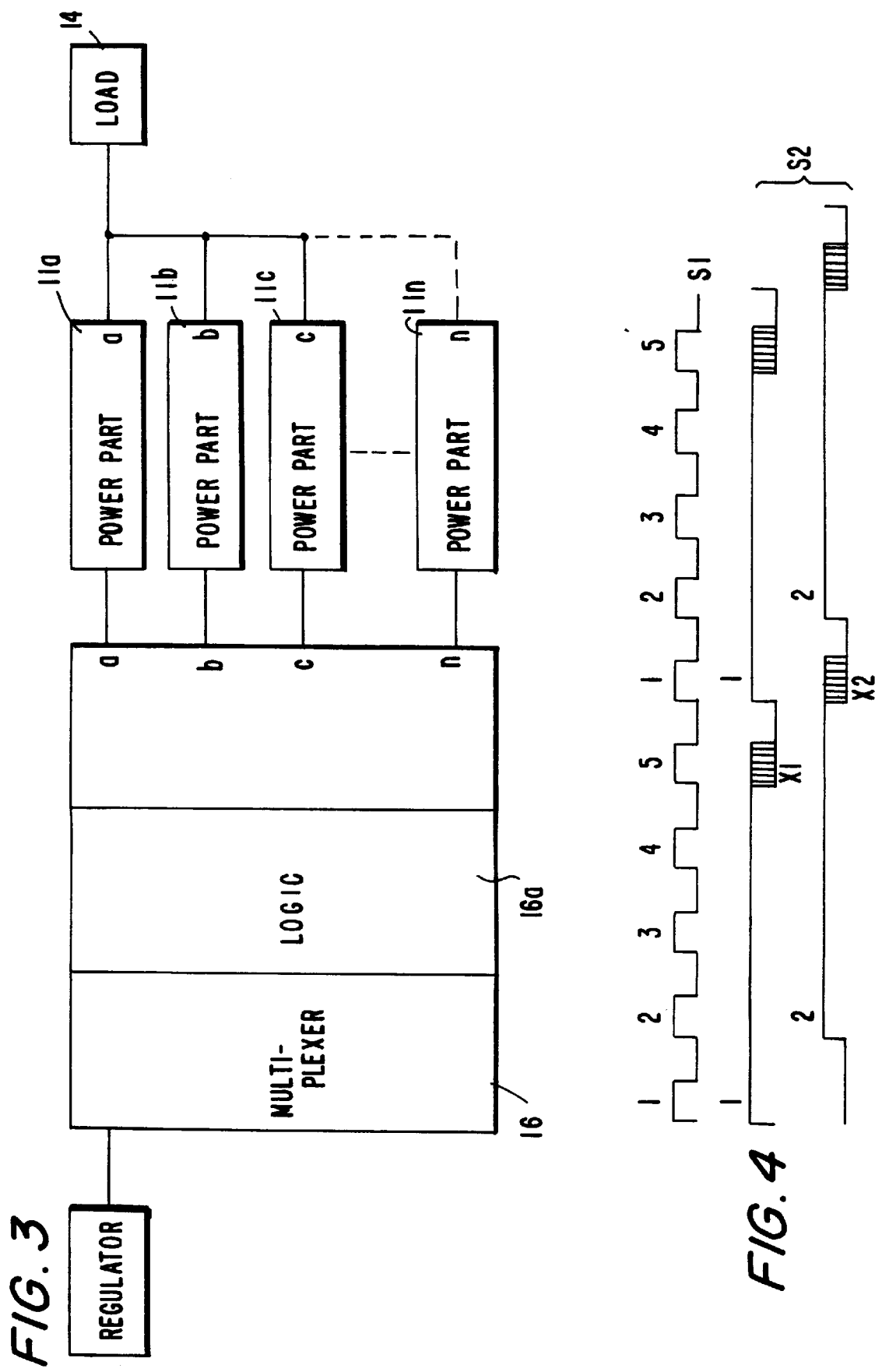

VOLTAGE CONVERSION DEVICE UTILIZING SYNCHRONOUSLY SEQUENTIAL CONTROLLED PARTIAL CONVERTERS

BACKGROUND OF THE INVENTION

1. Field of the Invention

The invention relates to a voltage conversion device, particularly for motor vehicles, and especially a voltage conversion device for a motor vehicle, which includes at least two parallel-connected voltage converters with a common input via which the voltage to be converted is supplied and with a common output at which the converted voltage is picked up.

2. Prior Art

In voltage supply systems, for instance in motor vehicles, the usual on-board electrical voltage is varied, with the aid of direct voltage converters, in such a way that voltages which are optimal to supply the consumers are obtained. One such voltage supply system for an on-board motor vehicle electrical system is known for instance from European Patent Disclosure EP-0 363 356 B1. In this voltage supply system, a plurality of direct voltage converters decoupled on the secondary side are present, whose input is supplied with the battery voltage. On the output side, the voltage converters lead via decoupling diodes to various electronic components, which they supply with a regulated direct voltage. The use of a plurality of direct voltage converters to generate a single output voltage is not contemplated in the known voltage supply system.

SUMMARY OF THE INVENTION

It is an object of the present invention to provide an improved voltage conversion device, especially for a motor vehicle.

This object, and others which will be made more apparent hereinafter, is attained in a voltage conversion device comprising at least two voltage converters connected in parallel with each other, having a common input at which a voltage to be converted is supplied and a common output at which an output converted voltage is delivered.

The voltage conversion device of the invention has the advantage over known devices that a voltage conversion is attained which has little load variations on the supply current. This advantageously assures that the supply current causes only little electromagnetic emission, and in general only slight supply fluctuations occur. Also advantageously, output current fluctuations are reduced compared with conventional systems, so that again only slight electromagnetic emission is produced by the output current, and only slight output current fluctuations occur. Since the individual load on the components used is low, an advantageous embodiment with small available, economical components is possible. A technologically complex parallel circuit, for instance using additional resistors with parallel-connected diodes, can be dispensed with.

These advantages are attained by using, instead of a single voltage converter, a selectable number of parallel-connected partial converters, which are synchronously sequentially triggered with the aid of a synchronizing device.

Further advantages of the invention are attained by the characteristics recited in the dependent claims. It is especially advantageous that depending on the needs and/or expense, partial converters that each have one complete regulator part and power part can be used. It is also possible to design the partial converters such that one partial converter has a complete regulator part and power part, while the other partial converter has only its own power parts and is triggered by a common controller.

In another advantageous feature, only a single regulator component is required, whose high switching frequency is distributed to various parallel power parts via a multiplexer that then drives the individual power parts. This makes maximum correction possible with little regulation expense and complication.

BRIEF DESCRIPTION OF THE DRAWING

Exemplary embodiments of the invention are shown in the drawing and will be described in further detail in the ensuing description. Specifically, FIGS. 1, 2 and 3 are block diagrams three different exemplary embodiments. In FIG. 4, a timing graph is shown for the multiplexing operation of the third exemplary embodiment.

DESCRIPTION OF THE PREFERRED EMBODIMENTS

In FIG. 1, a first exemplary embodiment of the invention is shown. In this exemplary embodiment, the voltage converter is divided up into a plurality of separate regulators $10a, 10b, 10c, \ldots, 10n$ and associated power parts $11a, 11b, 11c, \ldots, 11n$. Triggering of the regulator is done with the aid of a synchronizing device 12. The power parts $11a, 11b, 11c, \ldots, 11n$ are connected to one another at their outputs and lead to the load 14 that is to be supplied. The voltage U to be regulated or converted is supplied to the various power parts. At the outputs of the various power parts, the currents $I_a, I_b, I_c$, etc. occur, whose courses over time are also plotted in FIG. 1.

With the voltage converter shown in FIG. 1, which includes a plurality of complete regulators as well as a plurality of complete power parts each forming one partial converter, the supply current load and the alternating output current level can both be reduced, compared to a voltage converter which includes only one regulator one power part, each with at least one switching transistor. Since the power parts are connected parallel, when the individual partial converters, each comprising one regulator on one power part, are sequentially turned on, an output current can be attained that represents one brief current pulse for each individual system. The current pulses $I_a, I_b, I_c, \ldots$ of the individual partial regulators are staggered chronologically relative to one another. Before delivery to the load 14 to be supplied, the currents are superimposed on one another, so that the supply current for the load 14 is a relatively uniform and at most only slightly undulating current. In the ideal case, which always pertains with a constant input current U and a uniform output load as well as with complementary-switching transistors, the load variations on the input current drops toward zero. The output current fluctuation is likewise reduced. In the normal case, both the load variations and the output current fluctuations can be reduced to the following extent:

$$\delta IE = IGE/T$$
$$\delta IA = IGA/T$$

If the sequential triggering prevents switching partial converters from overlapping. The various abbreviations have the following meanings:

$\delta IE$: difference in the input current
IGE: total current at the input
$\delta IA$: difference in the output current IGA: total current at the output T: number of partial converters The exemplary embodiment of FIG. 1 is distinguished by maximum correction of input and output fluctuations. Since this requires both a number of separate regulators and one power part each, the exemplary embodiment of FIG. 1 is quite complex.

Conventional voltage regulators or control parts of conventional voltage regulators can be used as the regulators. The power parts may be conventional power parts with a corresponding switching transistor. A microprocessor can be used as the synchronizing device 14. It is also possible to use a suitable timing element, shift register, ASIC logic, or a suitable clock generator for the synchronization.

In FIG. 2, an exemplary embodiment of a voltage converter with a synchronized regulator and controller is shown. This voltage converter is again used to supply a load 14. By replacing the individual regulators 10b–10n of FIG. 1 with a controller with sequentially controlled outputs, the expense and complication for regulation can be reduced compared to the exemplary embodiment of FIG. 1. The controller 15 is connected to the regulator 10a and triggers the power parts 11b, 11c, . . . , 11n. The correction of input and output fluctuations of the current or voltage is done directly, at the power part 12a, and at the power parts 11b–11n is done by the regulator 10a via the controller 15.

With the exemplary embodiment shown in FIG. 2, a further option for voltage conversion is presented. This comprises correcting only a partial load range via the power part 12a. The remaining power part, that is, the power of the power parts 10b–10n, remains constant because of the controller.

In FIG. 3, a third exemplary embodiment of the invention is shown. In this variant, only one regulating component 17 is needed, whose high switching frequency to n parallel power parts 11a, 11b, 11c, . . . , 11n is divided up via a multiplexer 16 with a logic circuit 16a connected to it. This enables maximum correction at little expense for regulation.

The distribution of the output signal of the regulator can be explained with the aid of the timing graph shown in FIG. 4. At its output, the regulator outputs a switching frequency of 100 kHz, for example. The distribution of the regulator output signal to power parts, for instance five power parts 1–5, is done with the of the logic signal S1. The leading edge of this signal is fixedly synchronized, and the trailing edge is varied by the regulator depending on the input signal. The multiplexer 16 distributes the negative variable edges to the outputs a–n of the logic. During each of the times marked X, the output signals of the regulator reach the corresponding power parts. The signal courses are designated by the symbol S2.

Drawing captions by block number

| FIG. 1 | |
|---|---|
| 12 | Synchronization |
| 10a | Regulator a |
| 10b | Regulator b |
| 10c | Regulator c |
| 10n | Regulator n |
| 11a | Power part a |
| 11b | Power part b |
| 11c | Power part c |
| 11n | Power part n |
| 14 | Load |

-continued

| FIG. 2 | |
|---|---|
| 12 | Synchronization |
| 10a | Regulator a |
| 15 | Controller b |
| | c |
| | n |
| 11a | Power part a |
| 11b | Power part b |
| 11c | Power part c |
| 11n | Power part n |
| 14 | Load |
| FIG. 3 | |
| | Regulator |
| 16 | Multiplexer |
| 16a | Logic |
| 11a | Power part a |
| 11b | Power part b |
| 11d | Power part c |
| 11n | Power part n |
| 14 | Load |

What is claimed is:

1. A voltage conversion device, in particular for motor vehicles, comprising
at least two voltage converters connected in parallel with each other, having a common input at which a voltage to be converted is supplied and a common output at which an output converted voltage is delivered, each of said at least two voltage converters comprising a separately controllable partial converter, and each of said partial converters comprising a regulator and a power part; and
a synchronization device for synchronously sequentially controlling said partial converters, so that respective current outputs of said partial converters are displaced relative to each other.

2. A voltage conversion device, in particular for motor vehicles, comprising at least two voltage converters connected in parallel with each other, having a common input at which a voltage to be converted is supplied and a common output at which an output converted voltage is delivered, each of said at least two voltage converters comprising a separately controllable partial converter; and
a synchronization device for synchronously sequentially controlling said partial converters, so that respective current outputs of said partial converters are displaced relative to each other, and
wherein a first of said partial converters comprises a regulator and a power part and at least one additional one of said partial converters is provided with a controller, said controller comprising means for controlling partial currents from said at least one additional partial converter and being connected to said regulator of said first of said partial converters, whereby said regulator is connected with said synchronization device and influences said controller in operation.

3. A voltage conversion device, in particular for motor vehicles, comprising at least two voltage converters connected in parallel with each other, having a common input at which a voltage to be converted is supplied and a common output at which an output converted voltage is delivered, each of said at least two voltage converters comprising a separately controllable partial converter including a power part;
a synchronization device for synchronously sequentially triggering said partial converters, so that respective current outputs of said partial converters are displaced relative to each other, said synchronization device comprising a common regulator for said power parts, a multiplexer and a logic circuit, wherein said multiplexer and said logic circuit connect said common regulator with said power parts.

4. The voltage conversion device as defined in claim 3, wherein said regulator generates a high-frequency switching signal and said multiplexer and said logic circuit distribute said high-frequency switching signal to said power parts.

5. The voltage conversion device as defined in claim 3, wherein said logic circuit generates a logic signal having a leading edge fixed synchronously and a trailing edge varied by said regulator according to an input signal and said logic signal in cooperation with said multiplexer distributes said switching signal of said regulator to the respective power parts.

6. The voltage conversion device as defined in claim 5, wherein said multiplexer and said logic circuit have logic outputs (a–n) and said multiplexer distributes negative variable edges to said logic outputs.

* * * * *